United States Patent [19]

Schieder et al.

[11] 4,303,511

[45] Dec. 1, 1981

[54] METHOD OF PURIFYING TENSIDE AND DETERGENT CONTAMINATED WASTE WATERS

[75] Inventors: Erwin Schieder, Nuremberg; Rupert Stoiber, Erlangen, both of Fed. Rep. of Germany

[73] Assignee: Kraftwerk Union Aktiengesellschaft, Müheim, Fed. Rep. of Germany

[21] Appl. No.: 66,414

[22] Filed: Aug. 14, 1979

[30] Foreign Application Priority Data

Aug. 16, 1978 [DE] Fed. Rep. of Germany ....... 2835763

[51] Int. Cl.³ ............................................... C02F 1/52
[52] U.S. Cl. .................... 210/724; 210/738; 210/749
[58] Field of Search ......................... 210/49–53, 210/28

[56] References Cited

U.S. PATENT DOCUMENTS

| | | | |
|---|---|---|---|
| 3,137,634 | 6/1964 | Silker | 210/53 X |
| 3,285,849 | 11/1966 | Watanabe et al. | 210/52 |
| 3,474,033 | 10/1969 | Stout et al. | 210/50 |
| 3,577,341 | 5/1971 | Keith et al. | 210/53 |
| 3,736,254 | 5/1973 | Croom | 210/51 |
| 4,005,009 | 1/1977 | Kinoshita et al. | 210/51 X |

*Primary Examiner*—Thomas G. Wyse
*Attorney, Agent, or Firm*—Herbert L. Lerner

[57] ABSTRACT

Purifying waste waters contaminated with tensides, from nuclear power plants and other plants in which radioactive substances are processed wherein before return of the water to the plant, the water is passed through an evaporator and a mixed-bed filter. Contaminant content of the water is materially reduced by first acidifying the waste water to a pH of 2.5–3, then treating with activated carbon, $KMnO_4$, $MnSO_4$ and $CaCO_3$, and thereafter raising the pH to 8.5–9. The mixture is permitted to form a lower sludge layer and a supernatant water layer. The sludge layer is sent to waste disposal and the supernatant layer is directed to the evaporator.

3 Claims, 1 Drawing Figure

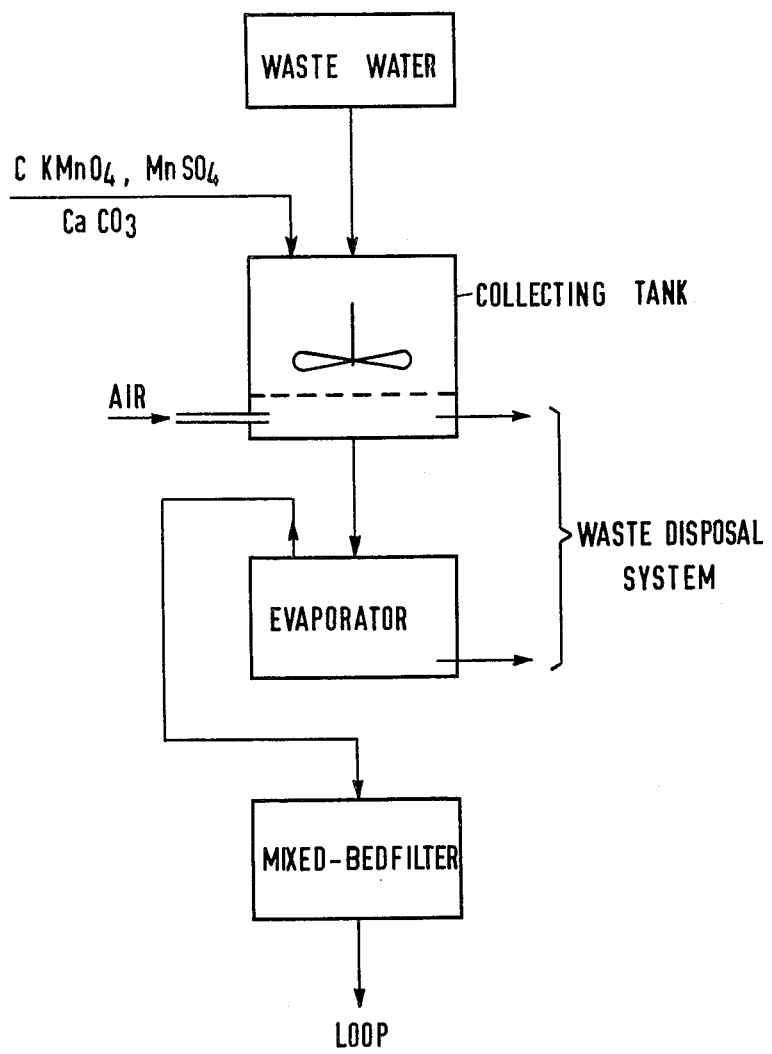

METHOD OF PURIFYING TENSIDE AND DETERGENT CONTAMINATED WASTE WATERS

BACKGROUND OF THE INVENTION

1. Field of the Invention

The present invention relates to a method of purifying tenside and detergent-containing waste waters of nuclear power plant installations and other plants, wherein the pre-purified water is returned to the water circulation of the operation via evaporators and mixed-bed filters.

2. Description of the Prior Art

Up to now it has been customary in installations of the above type to feed the waste water to the evaporator as well as to the mixed-bed filter via precoat filters or also to precipitation facilities. Pre-purification via precoat filters and precipitation facilities, however, would pick up only part of the tensides and detergents as well as oils and fats, so that the task of extracting the major part of these substances from the waste water fell to the mixed-bed filters. Unfortunately, the heavy loading of the mixed-bed filters with the tensides, detergents, oils and fats fouled the filters so as to be unregenerable when its filtering capacity was exhausted, or to be capable of regeneration only a relatively small number of times, so that they became a waste product and had to be put in the waste.

SUMMARY OF THE INVENTION

An object of the present invention is to provide a method for extracting these containments from the waste water as completely as possible or at least sufficiently to make the mixed-bed filters connected thereto regenerable and therefore, reusable again after they are exhausted.

With the foregoing and other objects in view, there is provided in accordance with the invention a method of purifying tenside-and detergent-containing contaminated waste waters of nuclear power plant installations and other plants in which radioactive substances are processed, wherein the contaminated water is prior to return to a water loop of the plant, passed through an evaporator and a mixed-bed filter, the improvement comprising (a) adjusting the pH of the contaminated waste water to a value of 2.5 to 3 by the addition of sulfuric acid, (b) adding the following reactants to the contaminated waste water:—finely-divided activated carbon, $KMnO_4$, $MnSO_4$ and $CaCO_3$, (c) agitating the waste water and reactants to effect intimate mixing of the reactants with the waste water, (d) adjusting the pH of the mixture to a value of 8.5-9 by the addition of an alkaline material, and (e) settling the alkaline mixture to form a lower sludge layer and a supernatant water layer of reduced contaminant content which is subsequently passed to the evaporator and mixed-bed filter.

Other features which are considered as characteristic for the invention are set forth in the appended claims.

Although the invention is illustrated and described herein as embodied in a method of purifying tenside and detergent contaminated waste waters, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing in which is a flowsheet diagrammatically illustrating one method of carrying out the operation of the invention.

DETAILED DESCRIPTION OF THE INVENTION

In accordance with the invention, the waste water is adjusted to a pH-value of 2.5 to 3 in a tank by means of sulfuric acid and is then reacted with finely-divided activated carbon, $KMnO_4$, $MnSO_4$, and $CaCO_3$. The mixture is mixed mechanically or by means of injected air for several minutes. The pH-value of the thus treated water is then raised, for instance, by ammonia or sodium hydroxide to 8.5-9 and is again mixed for several minutes. The supernatent water is further processed in known manner. The further processing involves feeding this treated water to an evaporator and the distillate thereof to a mixed-bed filter so that the filtrate leaving the latter can be returned to the loop of the plant from which the contaminated waste water was obtained.

In a long series of tests involving the trial of various reagents, the combination of four agents, namely activated carbon, $KMnO_4$, $MnSO_4$ and $CaCO_3$ was found to give optimum results. The quantities of agents will of course vary with the quantities of contaminants. Excess quantities of agents, while generally not harmful, are wasteful. In practice, we have found that a water composition having 10 mg/l cation active, 5 mg/l anion-active and 50 mg/l neutral tensides, with a minor amount, a small fraction of a percent of oils, and fats can be adequately treated with 100 mg/l activated carbon, 50 mg/l $KMnO_4$, 50 mg/l $MnSO_4$ and 50 mg/l $CaCO_3$ and will serve as a guideline for the quantities of agents to be used.

Often waste waters almost always show about the same tenside contents. In such instances the optimum quantities of agents can be readily determined by a few tests and the method thereby optimized also with respect to its economy.

The course of the purification process is summarized schematically in the attached figure: The waste water containing the contaminants is usually at a pH value above 6, more generally above 7, i.e. on the alkaline side and is first placed in a collecting vessel which may be any suitable tank equipped with agitating means, for instance, with a stirrer or also with an air injection device. First, the waste water is adjusted by the addition of sulfuric acid to a pH value of 2.5 to 3. Reaction with agents takes place best at that pH value. Subsequently, finely distributed activated carbon, $KMnO_4$, $MnSO_4$ and $CaCO_3$ are added in accordance with the quantity of waste water and its contaminant content contained therein, and are thoroughly mixed for several minutes.

After this mixing process, the pH value of the mixture is raised to 8.5-9 by the addition of an alkaline material, for instance, ammonia or sodium hydroxide and again mixed for several minutes either mechanically or by injection of air. Sludge is formed in the process and slowly settles at the bottom of the collecting tank forming a lower sludge layer in the tank and an upper supernatent water layer which has a markedly lower content of tensides, oils and fats than the contaminated waste water.

This settling procedure takes several hours. Subsequently, the sludge is drawn off to remove the waste and sent to the waste disposal system. The supernatant water is transferred from the collecting tank to the evaporator which is conventional equipment used in the treatment of water. The distillate released from the evaporator is then further purified in a mixed-bed filter of ion-exchange resins and also conventional, and the filtrate is returned to the loop of the plant. The sump remaining in the evaporator is likewise directed to the waste disposal system.

To illustrate the operation of this method, contaminated water containing about 10 mg/l cation-active, about 5 mg/l anion-active and about 50 mg/l neutral tensides, oils and fats was acidified with sulfuric acid to a pH of 2.5–3 and then treated with 100 mg/l activated carbon, 50 mg/l $KMnO_4$, 50 mg/l $MnSO_4$ and 50 mg/l $CaCO_3$. The pH was raised to 8.5–9 and sludge allowed to settle at the bottom. The treated water contained only 0.6 mg/l cation-active tensides, 1.0 mg/l anion-active tensides and less than 1 mg/l neutral tensides, oils and fats when transferred into the evaporator.

Tests with very different tenside contents in washing waters of nuclear power plants have always shown an efficiency of considerably above 80%. The filtrates from the mixed-bed filter could not only be returned to the loop but could also be fed to the normal waste water, as they had not yet reached the legal limits for waste water applicable thereto.

It is advantageous to admix commercially available antifoaming agents to the waste water, since this facilitates the mixing processes by inhibiting foam formation.

There are claimed:

1. Method of purifying tenside-and detergent-containing contaminated waste waters of nuclear power plant installations and other plants in which radioactive substances are processed, wherein the contaminated water is prior to return to a water loop of the plant, passed through an evaporator and a mixed-bed filter, the improvement comprising
   (a) adjusting the pH of the contaminated waste water to a value of 2.5 to 3 by the addition of sulfuric acid,
   (b) adding the following reactants to the contaminated waste water:—finely-divided activated carbon, $KMnO_4$, $MnSO_4$ and $CaCO_3$,
   (c) agitating the waste water and reactants to effect intimate mixing of the reactants with the waste water
   (d) adjusting the pH of the mixture to a value of 8.5–9 by the addition of an alkaline material, and
   (e) settling the alkaline mixture to form a lower sludge layer and a supernatant water layer of reduced contaminant content which is subsequently passed to the evaporator and mixed-bed filter.

2. Method according to claim 1, wherein about 100 mg/l activated carbon, about 50 mg/l $KMnO_4$, about 50 mg/l $MnSO_4$ and about 50 mg/l $CaCO_3$ are added to the contaminated waste water containing about 10 mg/l cation-active, about 5 mg/l anion-active and about 50 mg/l neutral tensides, and a minor amount of oils and fats.

3. Method according to claim 1, wherein an antifoaming agent is added to the contaminated waste water.

* * * * *